US009015400B2

(12) United States Patent (10) Patent No.: US 9,015,400 B2
Zeng et al. (45) Date of Patent: Apr. 21, 2015

(54) METHODS AND SYSTEMS FOR REDUCING THE AMOUNT OF TIME AND COMPUTING RESOURCES THAT ARE REQUIRED TO PERFORM A HARDWARE TABLE WALK (HWTW)

(71) Applicant: QUALCOMM Incorporated, San Diego, CA (US)

(72) Inventors: Thomas Zeng, San Diego, CA (US); Azzedine Touzni, San Diego, CA (US); Tzung Ren Tzeng, Santa Clara, CA (US); Phil J. Bostley, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/785,877

(22) Filed: Mar. 5, 2013

(65) Prior Publication Data

US 2014/0258586 A1 Sep. 11, 2014

(51) Int. Cl.
*G06F 12/02* (2006.01)
*G06F 12/10* (2006.01)
*G06F 9/455* (2006.01)

(52) U.S. Cl.
CPC ........ *G06F 12/1027* (2013.01); *G06F 9/45545* (2013.01); *G06F 2212/684* (2013.01); *G06F 2212/654* (2013.01); *G06F 9/45558* (2013.01); *G06F 2212/507* (2013.01);
(Continued)

(58) Field of Classification Search
CPC .......... G06F 12/1027; G06F 2212/507; G06F 2212/654; G06F 2212/684; G06F 9/45533; G06F 9/45545; G06F 9/45558
USPC ..................... 711/6, 154, 202–208
See application file for complete search history.

(56) References Cited

U.S. PATENT DOCUMENTS 5,581,722 A 12/1996 Welland
7,089,397 B1 * 8/2006 Anvin et al. .................. 711/207
7,117,290 B2 * 10/2006 Shen et al. ........................ 711/3
(Continued)

FOREIGN PATENT DOCUMENTS

WO 2011156021 A2 12/2011

OTHER PUBLICATIONS

Barr et al., "SpecTLB: A Mechanism for Speculative Address Translation", ISCA '11, Jun. 4-8, 2011, San Jose, California, USA, ACM 978-1-4503-0472-6/11/06, pp. 307-318. Retrieved on Sep. 30, 2014 from <http://delivery.acm.org/10.1145/2010000/2000101/p307-barr.pdf>.*

(Continued)

*Primary Examiner* — Arpan P. Savla
(74) *Attorney, Agent, or Firm* — Smith Risley Tempel Santos LLC

(57) ABSTRACT

A computer system and a method are provided that reduce the amount of time and computing resources that are required to perform a hardware table walk (HWTW) in the event that a translation lookaside buffer (TLB) miss occurs. If a TLB miss occurs when performing a stage 2 (S2) HWTW to find the PA at which a stage 1 (S1) page table is stored, the MMU uses the IPA to predict the corresponding PA, thereby avoiding the need to perform any of the S2 table lookups. This greatly reduces the number of lookups that need to be performed when performing these types of HWTW read transactions, which greatly reduces processing overhead and performance penalties associated with performing these types of transactions.

19 Claims, 6 Drawing Sheets

(52) U.S. Cl.
CPC ........... *G06F 9/45533* (2013.01); *G06F 12/10* (2013.01); *G06F 2212/151* (2013.01); *G06F 2212/171* (2013.01)

(56) References Cited

U.S. PATENT DOCUMENTS

| | | | |
|---|---|---|---|
| 7,124,170 B1 | 10/2006 | Sibert | |
| 7,124,274 B2 | 10/2006 | Watt et al. | |
| 7,822,941 B2 | 10/2010 | Vick et al. | |
| 7,934,036 B2 | 4/2011 | Conti et al. | |
| 8,051,301 B2 | 11/2011 | Barnes et al. | |
| 8,108,641 B2 | 1/2012 | Goss et al. | |
| 8,595,465 B1* | 11/2013 | Raz | 711/208 |
| 8,615,643 B2* | 12/2013 | Cohen et al. | 711/207 |
| 2003/0079103 A1 | 4/2003 | Morrow | |
| 2005/0125628 A1* | 6/2005 | Morrow et al. | 711/204 |
| 2006/0075285 A1 | 4/2006 | Madukkarumukumana et al. | |
| 2006/0206687 A1 | 9/2006 | Vega et al. | |
| 2006/0224815 A1 | 10/2006 | Yamada | |
| 2007/0226795 A1 | 9/2007 | Conti et al. | |
| 2008/0133875 A1* | 6/2008 | Cohen et al. | 711/207 |
| 2012/0117301 A1 | 5/2012 | Wingard | |
| 2012/0226888 A1* | 9/2012 | Rychlik et al. | 711/207 |
| 2013/0103923 A1* | 4/2013 | Pan | 711/207 |
| 2014/0258663 A1 | 9/2014 | Zeng et al. | |

OTHER PUBLICATIONS

Travis Lanier, "Exploring the Design of the Cortex-A15 Processor—ARM's next generation mobile applications processor", 2011, ARM, pp. 1-33. Retrieved on Oct. 1, 2014 from <https://web.archive.org/web/20110915172027/http://www.arm.com/files/pdf/AT-Exploring_the_Design_of_the_Cortex-A15.pdf>.*

Ahn J., et al., "Revisiting hardware-assisted page walks for virtualized systems", Computer Architecture (ISCA). 2012 39th Annual International Symposium on, IEEE, Jun. 9, 2012, XP032200057, DOI: 10.1109/ISCA.2012.6237041, ISBN: 978-1-4673-0475-7, pp. 476-487.

Basu A., et al., "Efficient virtual memory for big memory servers", Computer Architecture, ACM, 2 Penn Plaza, Suite 701 New York NY 10121-0701 USA, Jun. 23, 2013, XP058021243, DOI: 10.1145/2485922.2485943, ISBN: 978-1-4503-2079-5, pp. 237-248.

Hoang G., et al., "A Case for Alternative Nested Paging Models for Virtualized Systems", IEEE Computer Architecture Letters, IEEE, US, vol. 9, No. 1, Jan. 1, 2010, XP011329026, ISSN: 1556-6056, DOI: 10.1109/L-CA.2010.6, pp. 17-20.

International Search Report and Written Opinion—PCT/US2014/020101—ISA/EPO—Jun. 6, 2014.

* cited by examiner

US 9,015,400 B2

METHODS AND SYSTEMS FOR REDUCING THE AMOUNT OF TIME AND COMPUTING RESOURCES THAT ARE REQUIRED TO PERFORM A HARDWARE TABLE WALK (HWTW)

TECHNICAL FIELD OF THE INVENTION

The invention relates to computer systems, and more particularly, to computer systems and methods for use in computer system for reducing the amount of time and computing resources that are required to perform a hardware table walk (HWTW).

BACKGROUND OF THE INVENTION

Modern computer systems use memory management units (MMUs) to manage writing data to and reading data from one or more physical memory devices, such as solid state memory devices, for example. The MMU of a computer system provides a virtual memory to the central processing unit (CPU) of the computer system that allows the CPU to run each application program in its own dedicated, contiguous virtual memory address space rather than having all of the application programs share the physical memory address space, which is often fragmented, or non-contiguous. The purpose of the MMU is to translate virtual memory addresses (VAs) into physical memory addresses (PAs) for the CPU. The CPU indirectly reads and writes PAs by directly reading and writing VAs to the MMU, which translates them into PAs and then writes or reads the PAs.

In order to perform the translations, the MMU accesses page tables stored in the system main memory. The page tables are made up of page table entries. The page table entries are information that is used by the MMU to map the VAs into PAs. The MMU typically includes a translation lookaside buffer (TLB), which is a cache memory element used to cache recently used mappings. When the MMU needs to translate a VA into a PA, the MMU first checks the TLB to determine whether there is a match for the VA. If so, the MMU uses the mapping found in the TLB to compute the PA and then accesses the PA (i.e., reads or writes the PA). This is known as a TLB "hit." If the MMU does not find a match in the TLB, this is known as a TLB "miss."

In the event of a TLB miss, the MMU performs what is known as a hardware table walk (HWTW). A HWTW is a time-consuming and computationally-expensive process that involves performing a "table walk" to find the corresponding page table in the MMU and then reading multiple locations in the page table to find the corresponding VA-to-PA address mapping. The MMU then uses the mapping to compute the corresponding PA and writes the mapping back to the TLB.

In computer systems that implement operating system (OS) virtualization, a virtual memory monitor (VMM), also commonly referred to as a hypervisor, is interposed between the hardware of the computer system and the system OS of the computer system. The hypervisor executes in privileged mode and is capable of hosting one or more guest high-level OSs. In such systems, application programs running on the OSs use VAs of a first layer of virtual memory to address memory, and the OSs running on the hypervisor use intermediate physical addresses (IPAs) of a second layer of virtual memory to address memory. In the MMU, stage 1 (S1) translations are performed to translate each VA into an IPA and stage 2 (S2) translations are performed to translate each IPA into a PA.

If a TLB miss occurs when performing such translations, a multi-level, two-dimensional (2-D) HWTW is performed to obtain the table entries that are needed to compute the corresponding IPA and PA. Performing these multi-level, 2-D HWTWs can result in a significant amount of computational overhead for the MMU, which typically results in performance penalties.

FIG. 1 is a pictorial illustration of a known three-level, 2-D HWTW that is performed when a TLB miss occurs while performing a read transaction. The HWTW shown in FIG. 1 represents a worst case scenario for a three-level, 2-D HWTW that requires the performance of fifteen table lookups to obtain the PA where the data is stored in physical memory. For this example, the MMU of the computer system is running a hypervisor that is hosting at least one guest high-level OS (HLOS), which, in turn, is running at least one application program. In such a configuration, the memory that is being allocated by the guest HLOS is not the actual physical memory of the system, but instead is the aforementioned intermediate physical memory. The hypervisor allocates actual physical memory. Therefore, each VA is translated into an IPA, which is then translated into a PA of the actual physical memory where the data being read is actually stored.

The process begins with the MMU receiving a S1 page global directory (PGD) IPA 2. For this worst case scenario example, it will be assumed that a TLB miss occurs when the MMU checks the TLB for a match. Because of the miss, the MMU must perform a HWTW. The HWTW involves performing three S2 table lookups 3, 4 and 5 to obtain the mapping needed to convert the IPA 2 into a PA and one additional lookup 6 to read the PA. The table lookups 3, 4 and 5 involve reading the S2 PGD, page middle directory (PMD) and page table entry (PTE), respectively. Reading the PA at lookup 6 provides the MMU with a S1 PMD IPA 7. For this worst case scenario example, it will be assumed that a TLB miss occurs when the MMU checks the TLB for a match with the S1 PMD IPA 7. Because of the miss, the MMU must perform another HWTW. The HWTW involves performing three S2 table lookups 8, 9 and 11 to obtain the mapping needed to convert the S1 PMD IPA 7 into a PA and one additional lookup 12 to read the PA. The table lookups 8, 9 and 11 involve reading the S2 PGD, PMD and PTE, respectively. Reading the PA at lookup 12 provides the MMU with a S1 PTE IPA 13.

For this worst case scenario example, it will be assumed that a TLB miss occurs when the MMU checks the TLB for a match with the S1 PTE IPA 13. Because of the miss, the MMU must perform another HWTW. The HWTW involves performing three S2 table lookups 14, 15 and 16 to obtain the mapping needed to convert the S1 PTE IPA 13 into a PA and one additional lookup 17 to read the PA. The table lookups 14, 15 and 16 involve reading the S2 PGD, PMD and PTE, respectively. Reading the PA at lookup 17 provides the MMU with the actual IPA 18. For this worst case scenario example, it will be assumed that a TLB miss occurs when the MMU checks the TLB for a match with the actual IPA 18. Because of the miss, the MMU must perform another HWTW. The HWTW involves performing three S2 table lookups 19, 21 and 22 to obtain the mapping needed to convert the actual IPA 18 into a PA. The table lookups 19, 21 and 22 involve reading the S2 PGD, PMD and PTE, respectively. The PA is then read to obtain the corresponding read data. Reading the PA at lookup 18 provides the MMU with a S1 PTE IPA 13.

Thus, it can be seen that in the worst case scenario for a three-level, 2-D HWTW, twelve S2 table lookups and three S1 table lookups are performed, which is a large amount of computational overhead that consumes are large amount of time and results in performance penalties. A variety of techniques and architectures have been used to reduce the amount of time and processing overhead that is involved in performing HWTWs, including, for example, increasing the size of the TLB, using multiple TLBs, using flat nested page tables, using shadow paging or speculative shadow paging, and using page walk cache. While all of these techniques and architectures are capable of reducing processing overhead associated with performing HWTWs, they often result in an increase in processing overhead somewhere else in the computer system.

Accordingly, a need exists for computer systems and methods that reduce the amount of time and computing resources that are required to perform a HWTW.

SUMMARY OF THE INVENTION

The invention is directed to a computer system and a method for use in a computer system for reducing the amount of time and computing resources that are required to perform a HWTW. The computer system comprises at least one central processing unit (CPU), at least one physical memory, at least one TLB, and at least one MMU. The CPU runs a host OS and a hypervisor. The hypervisor controls execution of at least a first guest OS on the CPU. The hypervisor runs at least a first VM associated with the first guest OS. The physical memory has physical memory locations that are addressable by PAs. At least one page table is stored at physical memory locations of the physical memory. The page table comprises page table entries corresponding to mappings for mapping an IPA into an actual PA of the physical memory. The TLB stores a subset of the page table entries. When a memory access is being performed, the MMU determines whether or not page table entries associated with an IPA are stored in the TLB. If page table entries associated with the IPA are not stored in the TLB, then a TLB miss has occurred. If a TLB miss occurs, the MMU predicts a PA of the physical memory at which data associated with the IPA is stored, thereby obviating the need to perform a HWTW to compute the PA.

The method comprises:
  in the MMU:
    determining whether or not page table entries associated with an IPA are stored in the TLB;
    if a determination is made that page table entries associated with the IPA are not stored in the TLB, then deciding that a TLB miss has occurred; and
    if a decision was made that a TLB miss has occurred, predicting a PA of the physical memory at which data associated with the IPA is stored.

The invention also provides a computer-readable medium (CRM) that stores computer code for execution by one or more processors for reducing processing overhead associated with performing a HWTW. The computer code comprises first and second code portions. The first code portion determines whether or not page table entries associated with an IPA are stored in the TLB. If a determination is made that page table entries associated with the IPA are not stored in the TLB, then the first code portion decides that a TLB miss has occurred. the second code portion predicts a PA of physical memory at which data associated with the IPA is stored if the first code portion decides that a TLB miss has occurred.

These and other features and advantages will become apparent from the following description, drawings and claims.

DETAILED DESCRIPTION OF ILLUSTRATIVE EMBODIMENTS

In accordance with illustrative embodiments described herein, a computer system and a method for use in a computer system are provided for reducing the amount of time and computing resources that are required to perform a HWTW. In accordance with embodiments described herein, when a TLB miss occurs when performing a S2 HWTW to find the PA at which a S1 page table is stored, the MMU uses the IPA to predict the corresponding PA, thereby avoiding the need to perform any of the S2 table lookups. This greatly reduces the number of lookups that need to be performed when performing these types of HWTW read transactions, which greatly reduces processing overhead and performance penalties associated with performing these types of transactions.

Figure 2:
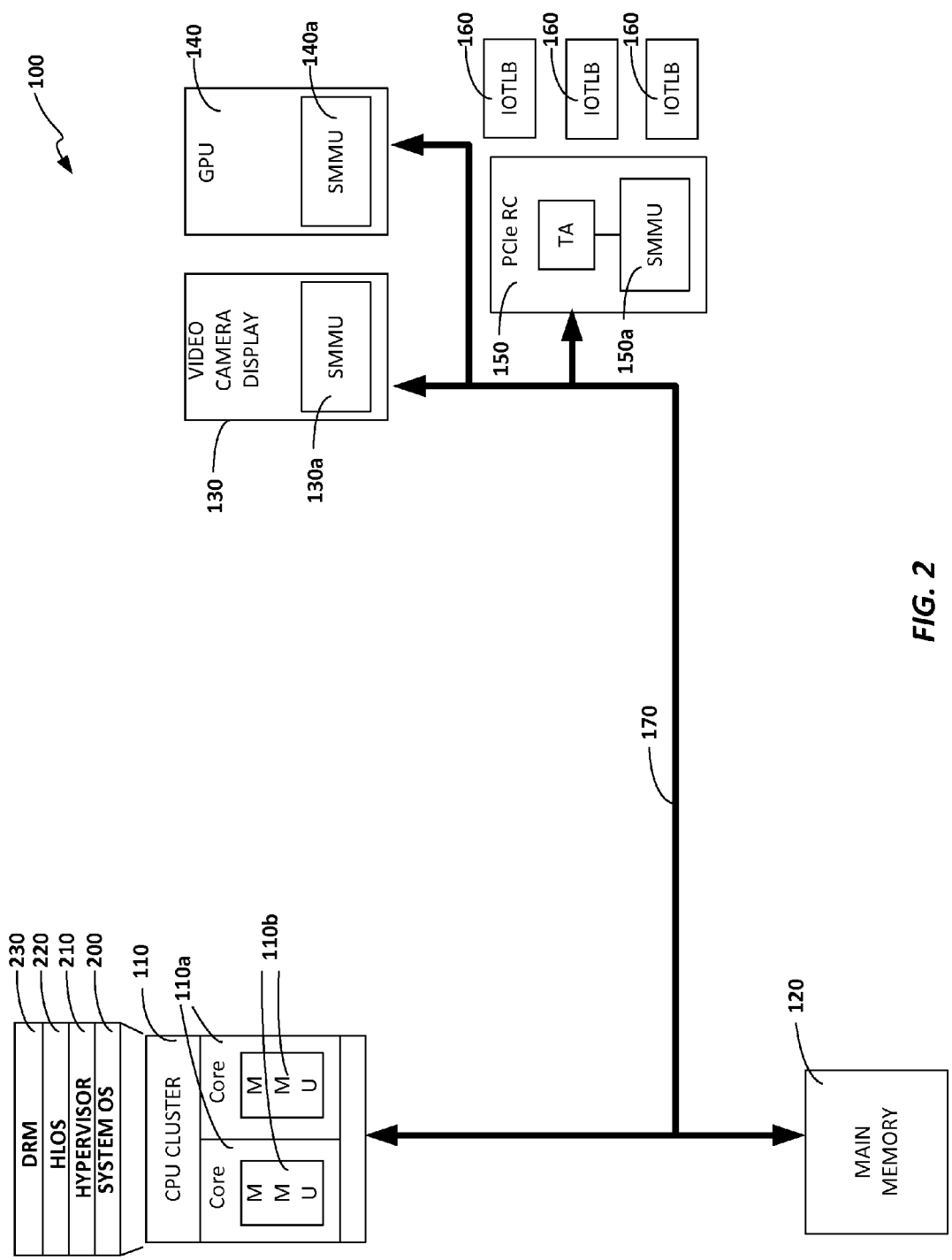
FIG. 2 illustrates a block diagram of a computer system in accordance with an illustrative, or exemplary, embodiment configured to perform the method for reducing the amount of time and computing resources that are required to perform a HWTW.

FIG. 2 illustrates a block diagram of a computer system 100 in accordance with an illustrative, or exemplary, embodiment configured to perform the method for reducing the amount of time and computing resources that are required to perform a S2 HWTW to find the PA at which a S1 page table is stored. The example of the computer system 100 shown in FIG. 2 includes a CPU cluster 110, a main memory 120, a video camera display 130, a graphical processing unit (GPU) 140, a peripheral connect interface express (PCIe) input/output (IO) device 150, a plurality of IO TLBs (IOTLBs) 160, and a system bus 170. The CPU cluster 110 has a plurality of CPU cores 110a, each of which has an MMU 110b. Each CPU core 110a may be a microprocessor or any other suitable processor. The video camera display 130 has a system MMU (SMMU) 130a. The GPU 140 has its own SMMU 140a. Likewise, the PCIe IO device 150 has its own SMMU 150a.

The MMUs 110b of the processor cores 110a are configured to perform the tasks of translating VAs into IPAs and translating IPAs into PAs. The page tables are stored in main memory 120. Each of the MMUs 110b and the SMMUs 130a, 140a and 150a has its own TLB (not shown for purposes of clarity) that store subsets of the page tables that are stored in main memory 120. In accordance with this illustrative embodiment, after the occurrence of a TLB miss, the MMUs 110b perform a prediction algorithm that processes an IPA to predict a PA. The prediction algorithm may be mathematically expressed as:

$$PA = f(IPA),$$  (Equation 1)

where f represents a mathematical function. The functions f that may be used for this purpose are described below in detail with reference to FIG. 5. The phrase "to predict," as that phrase is used herein, means "to determine," and does not imply a stochastic or probabilistic determination, although stochastic or probabilistic determinations are not necessarily excluded from the scope of the invention. The predictions that are made by the prediction algorithm are typically, but not necessarily, deterministic.

The CPU cluster 110 runs a system OS 200 and a virtual machine monitor (VMM), or hypervisor, 210. The hypervisor 210 manages the translation tasks, which includes, in addition to performing the translations, updating the page tables stored in the MMUs 110b and the SMMUs 130a, 140a and 150a. The hypervisor 210 also runs a guest HLOS 220 and/or a guest digital rights manager (DRM) 230. The HLOS 220 may be associated with the video camera display 130 and the DRM 230 may be associated with the GPU 140. The hypervisor 210 manages the HLOS 220 and the DRM 230.

After a TLB miss occurs, the hypervisor 210 configures the MMUs 110b and the SMMUs 130a, 140a and 150a to perform the prediction algorithm to convert the IPA into a PA. In such cases the starting IPA for the VA associated with the TLB miss is obtained from a hardware base register (not shown for purposes of clarity) of the CPU cluster 110 in the typical manner in which an S1 translation normally begins. The prediction algorithm then predicts the PA in accordance with Equation 1, as will be described below in more detail. To manage and update the SMMUs 130a, 140a and 150a, the CPU MMU 110b sends distributed virtual memory (DVM) messages over the bus 170 to the SMMUs 130a, 140a, and 150a. The MMUs 110b and the SMMUs 130a, 140a and 150a access main memory 120 to perform HWTWs.

In accordance with an illustrative embodiment, the CPU MMU 110b classifies MMU traffic into three transaction classes, namely: (1) S2 HWTW read transactions to find the PA at which a S1 page table is stored; (2) Client transactions; and (3) address fault (AF)/dirty flag write transactions. In accordance with this illustrative embodiment, the prediction algorithm only converts IPAs into PAs for class 1 transactions, i.e., HWTW read transactions. For all other classes of transactions, in accordance with this illustrative embodiment, the MMUs 110b and SMMUs 130a, 140a and 150a performs all other translations (e.g., S1 and client transaction S2 translations) in the typical manner.

Figure 3:
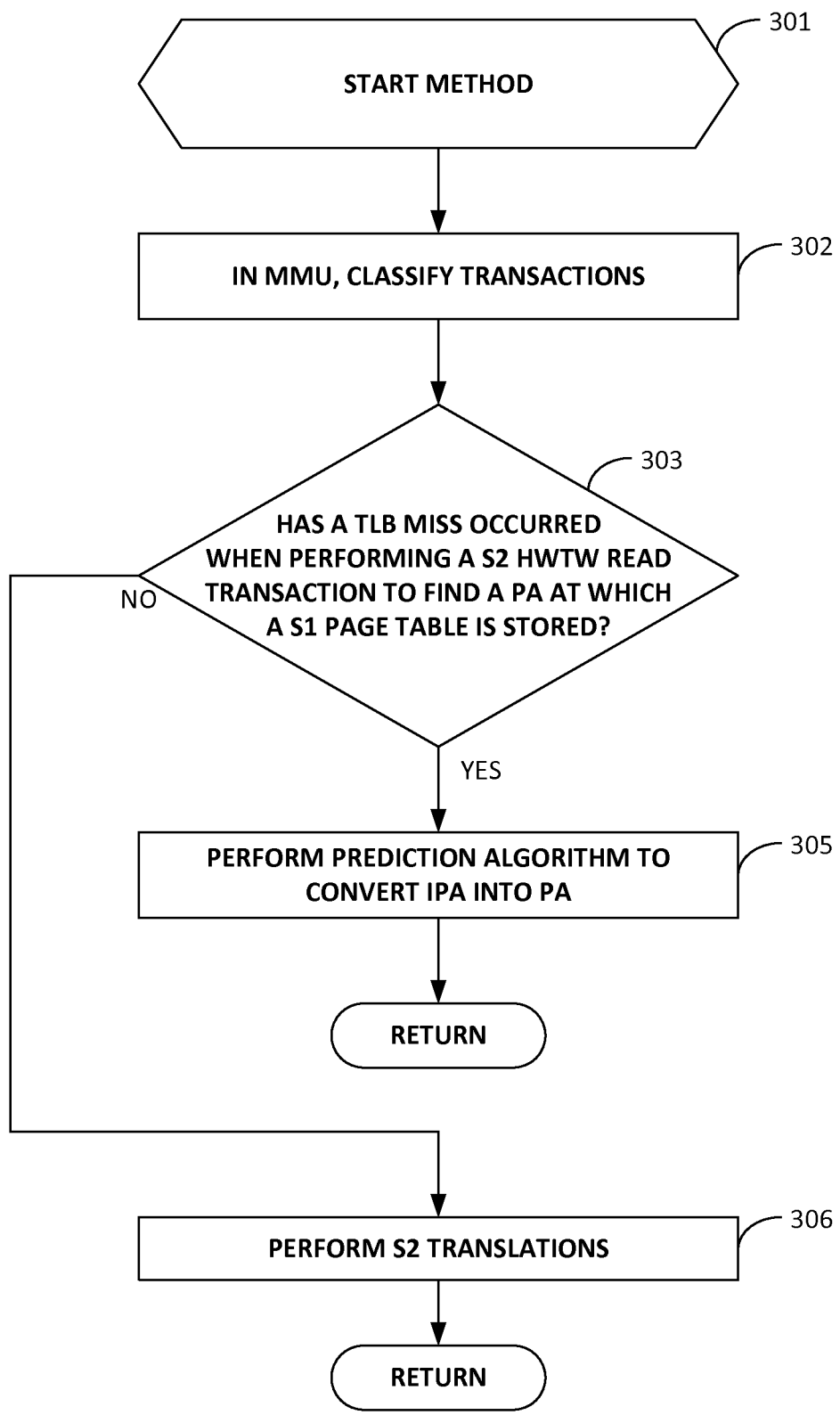
FIG. 3 is a flowchart that represents the method, in accordance with an illustrative embodiment, performed by the hypervisor shown in FIG. 2 to reduce the amount of time and processing overhead that is required to perform a HWTW read transaction.

FIG. 3 is a flowchart that represents the method, in accordance with an illustrative embodiment, performed by the CPU MMU 110b to reduce the amount of time and processing overhead that is required to perform a HWTW read transaction. Block 301 represents the method starting, which typically occurs when the CPU cluster 110 boots up and begins running the system OS 200 and the hypervisor 210. The MMUs 110b classify traffic into the aforementioned transaction classes (1), (2) and (3), as indicated by block 302. The classification process may classify transactions into more or less than these three classes, but at least one of the classifications will be class (1) transactions, i.e., S2 HWTW read transactions to find the PA at which a S1 page table is stored. At the step represented by block 303, a determination is made as to whether a TLB miss has occurred when performing a class (1) transaction. If not, the method proceeds to block 306, at which the MMU 110b or SMMU 130a, 140a or 150a perform a HWTW in the normal manner.

If, at the step represented by block 303, the CPU MMU 110b determines that the miss occurred when performing a class (1) transaction, then the method proceeds to the step represented by block 305. At the step represented by block 305, the aforementioned prediction algorithm is performed to convert or translate the IPA into a PA.

Figure 4:
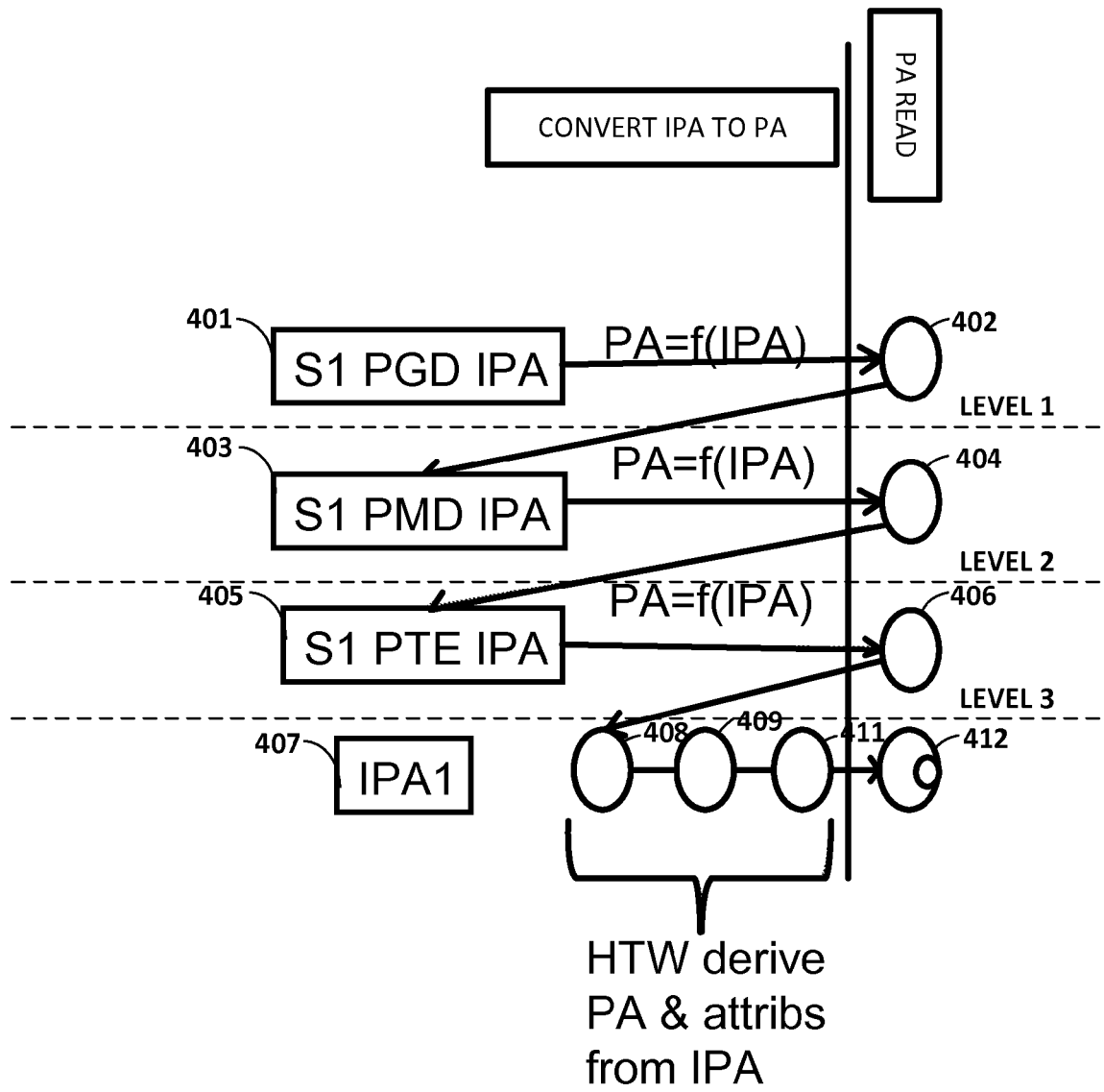
FIG. 4 is a pictorial diagram that demonstrates the manner in which a HWTW read transaction is performed using the method represented by the flowchart shown in FIG. 3 in accordance with an illustrative embodiment.

FIG. 4 is a pictorial diagram that demonstrates the manner in which a HWTW read transaction is performed in accordance with an illustrative embodiment. For this illustrative embodiment, it is assumed for exemplary purposes that the page tables are three-level page tables and that HWTWs are 2-D HWTWs. The example also assumes a TLB miss worst case scenario. The process begins with the MMU receiving a VA and then retrieving S1 PGD IPA 401 from a control register (not shown for purposes of clarity). The MMU then checks the TLB for a match with S1 PGD IPA 401. For this worst case scenario example, it will be assumed that a TLB miss occurs when the MMU checks the TLB for a match. Because of the miss, the MMU performs the prediction algorithm to convert S1 PGD IPA 401 into a PA 402 at which an S1 PMD IPA 403 is stored. Thus, a single lookup is used to convert S1 PGD IPA 401 into PA 402.

For this worst case scenario example, it will be assumed that a TLB miss occurs when the MMU checks the TLB for a match with the S1 PMD IPA 403. Because of the miss, the MMU performs the prediction algorithm to convert S1 PMD IPA 403 into a PA 404 at which S1 PTE IPA 405 is stored. Thus, a single lookup is used to convert S1 PMD IPA 403 into PA 404. For this worst case scenario example, it will be assumed that a TLB miss occurs when the MMU checks the TLB for a match with the S1 PTE IPA 405. Because of the miss, the MMU performs the prediction algorithm to convert S1 PTE IPA 405 into a PA 406 at which IPA1 407 is stored. Once IPA1 407 has been obtained, three lookups 408, 409 and 411 are performed to obtain the ultimate PA 412 where the data to be read is stored.

Figure 1:
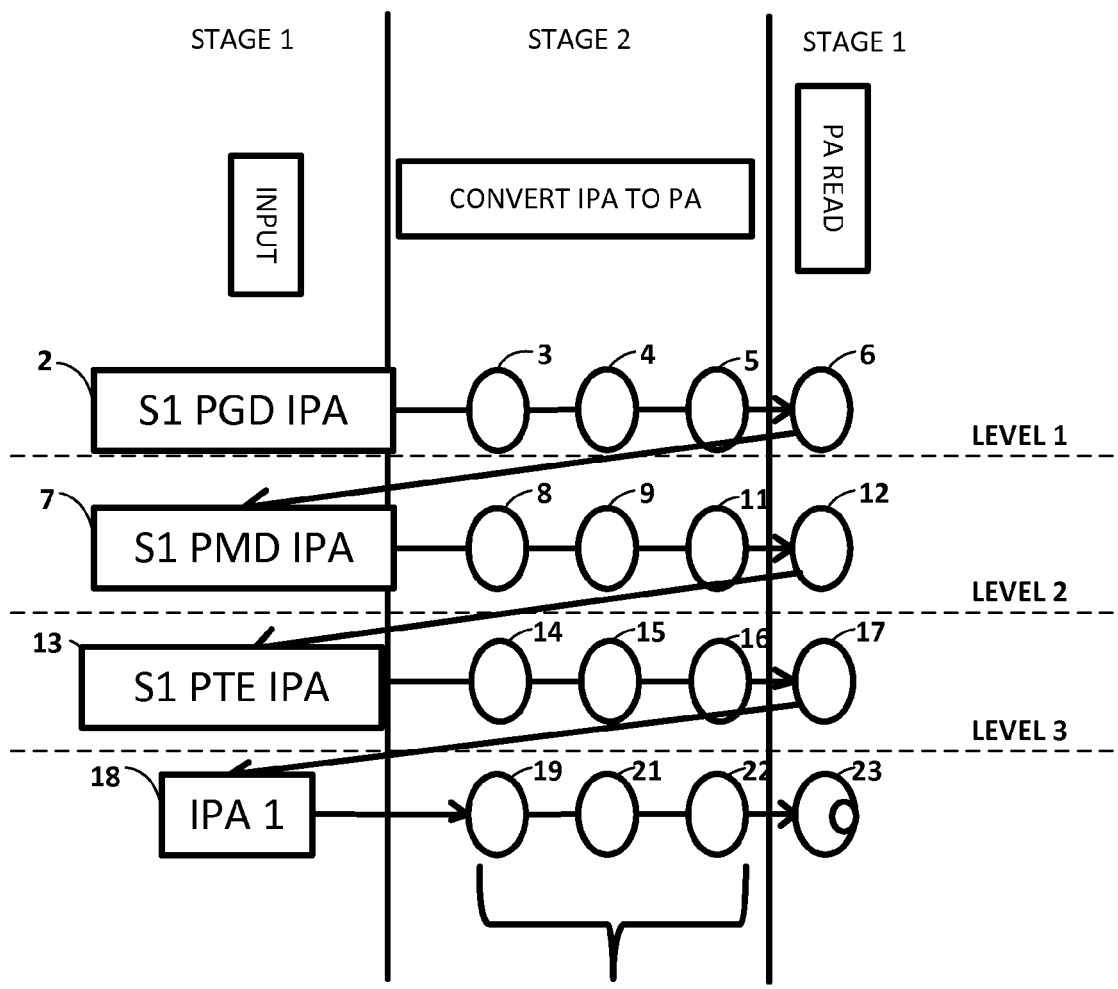
FIG. 1 is a block diagram of a computer system in accordance with an illustrative embodiment of the invention.

Thus, in accordance with this embodiment, it can be seen that the total number of lookups has been reduced from fifteen (FIG. 1) to six, which represents a 60% reduction in processing overhead. Of course, the invention is not limited to MMU configurations that have a particular number of levels or a particular number of HWTW dimensions. Those skilled in the art will understand that the concepts and principles of the invention apply regardless of the configuration of the page tables. Also, although the method and system are being described herein with reference to IPA-to-PA conversion, they are equally applicable to direct VA-to-PA conversions in systems that do not use IPAs.

Figure 5:
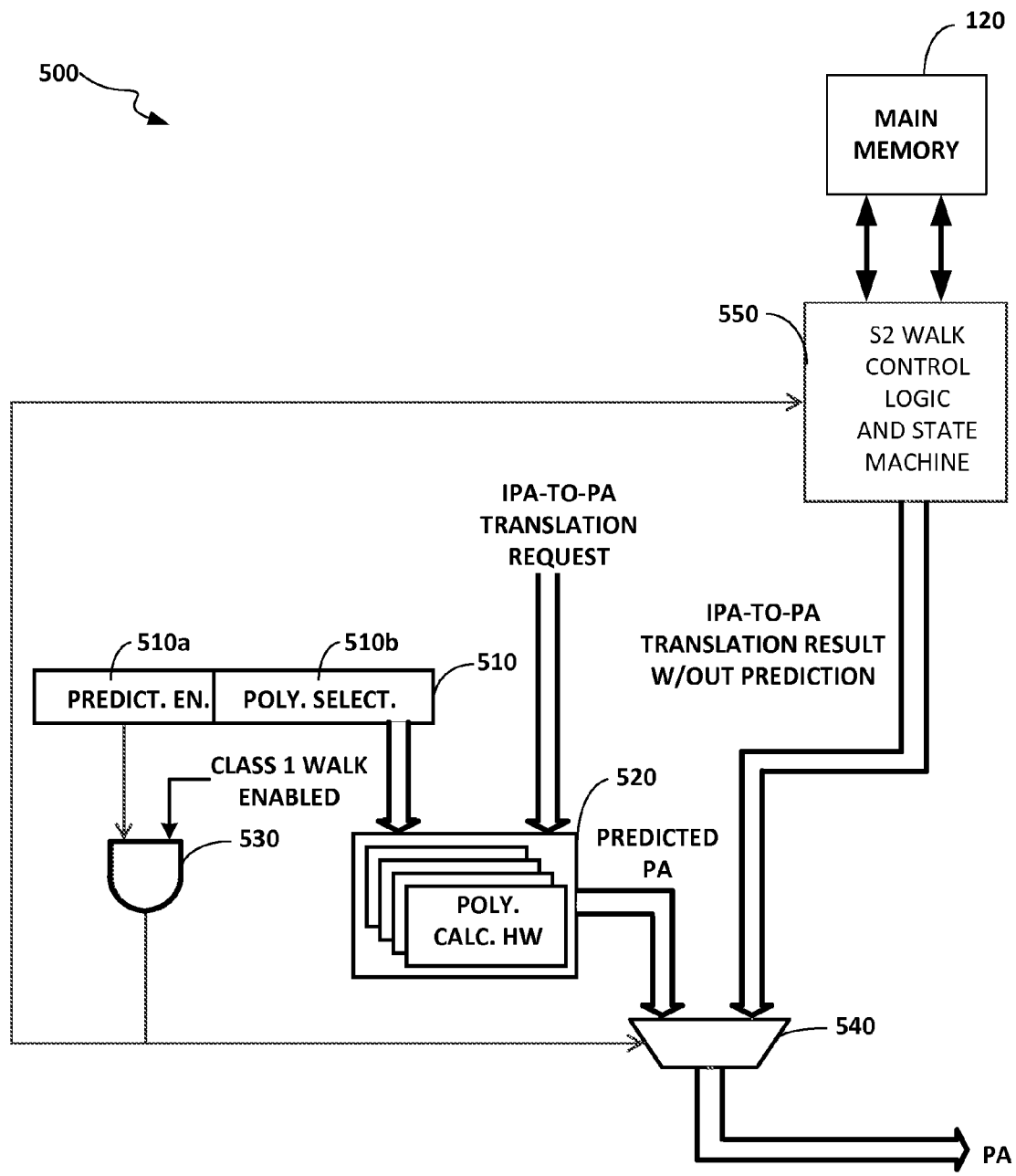
FIG. 5 is a block diagram of a hardware predictor in accordance with an illustrative embodiment that performs the method represented by the flowchart shown in FIG. 3.

FIG. 5 is a block diagram of an illustrative embodiment of a predictor 500 that performs the prediction algorithm. The predictor 500 is typically implemented in the MMUs 110b and in the SMMUs 130a, 140a and 150a. As indicated above, in accordance with the illustrative embodiment, the prediction algorithm is only performed when performing a class 1 read transaction. The configuration of the predictor 500 shown in FIG. 5 is an example of one configuration that allows the predictor 500 to be enabled for class 1 transactions and to be disabled for all other classes of transactions, including class 2 and 3 transactions.

The configuration of the predictor 500 shown in FIG. 5 also allows the predictor 500 to select the function, f, that is used in Equation 1 above to compute the PA based on the IPA. Each virtual machine (VM) may be using a different set of functions, f, so it is important that the sets of functions that are used ensure that there is a one-to-one mapping between IPA and PA over the range of IPA. The hypervisor 210 may be managing multiple HLOSs or DRMs, each of which will have a corresponding VM running in the hypervisor 210. The sets of functions that are used ensure that the predicted PA does not overlap a predicted PA allocated to another VM.

Examples of the function f are:

PA=IPA;

PA=IPA+Offset_function(VMID), where VMID is a unique identifier across all VMs that identifies the VM associated with the HWTW read transaction, and Offset_function is a function having an output that is selected based on a particular offset value associated with the VMID; and PA=IPA XOR Extended_VMID, where XOR represents and exclusive OR operation and Extended_VMID is an extended VMID. The hypervisor 210 selects the function f such that collisions between VMs are avoided.

In FIG. 5, it is assumed that the function f is a polynomial and that the hypervisor 210 selects a polynomial to be used as the function f from a plurality of polynomials. The polynomial that is selected may be based on, for example, the VMID of the VM for which the HWTW read transaction is being performed. A configuration register 510 of the predictor 500 holds one or more prediction enable bits 510*a* and one or more polynomial selection bits 510*b*. Polynomial calculation hardware 520 of the predictor 500 comprises hardware that selects a polynomial function based on the value of the polynomial selection bits 510*b* received from register 510. The polynomial calculation hardware 520 also receives an IPA-to-PA translation request and processes the request in accordance with the selected polynomial function to produce a predicted PA.

The prediction enable bit 510*a* and a class 1 enable bit are received at the inputs of an AND gate 530. The class 1 enable bit is asserted when a miss has occurred when performing a class 1 read transaction. A multiplexer (MUX) 540 of the predictor 500 receives the output of the AND gate 530 at a selector port of the MUX 540 and receives the predicted PA and the IPA-to-PA translation result obtained in the normal manner. When both the prediction enable bit 510*a* and the class 1 enable bit are asserted, the S2 WALK Control Logic And State Machine 550 is disabled and the MUX 540 selects the predicted PA to be output from the MUX 540.

When the prediction enable bit 510*a* and/or the class 1 enable bit is deasserted, the S2 Walk Control Logic And State Machine 550 is enabled. When the S2 Walk Control Logic And State Machine 550 is enabled, other types of S2 walks (e.g., class 2 and class 3) may be performed in main memory 120 by the S2 Walk Control Logic And State Machine 550. Thus, when the S2 Walk Control Logic And State Machine 550 is enabled, the MUX 540 outputs the IPA-to-PA translation result that is output from the S2 Walk Control Logic And State Machine 550.

It should be noted that the predictor 500 may have many different configurations. The configuration of the predictor 500 shown in FIG. 5 is merely one of many suitable configurations for performing the prediction algorithm. Persons of skill in that art will understand that many configurations other that shown in FIG. 5 may be used to perform the prediction algorithm.

Figure 6:
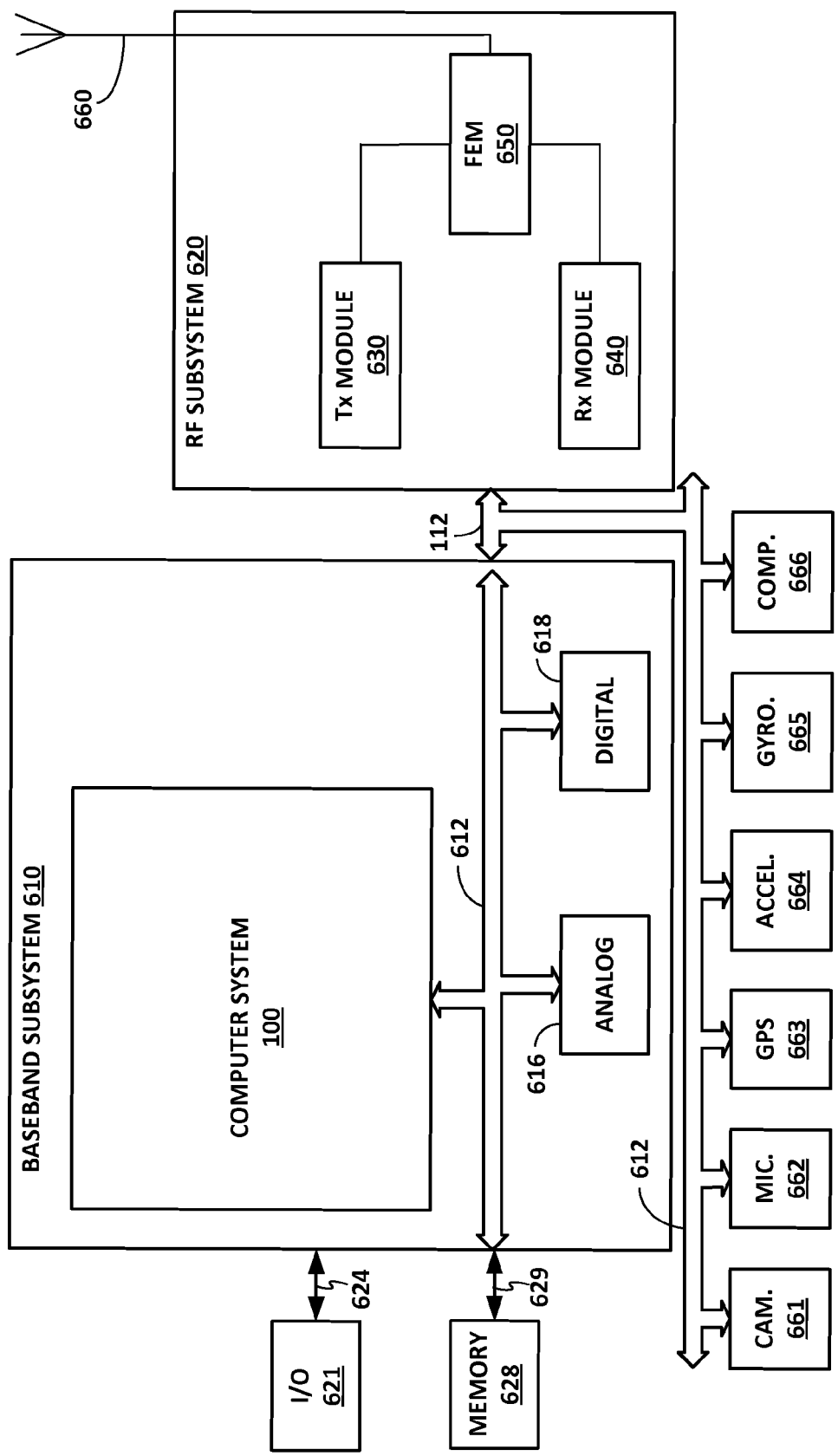
FIG. 6 illustrates a block diagram of a mobile smartphone in which the computer system shown in FIG. 2 is incorporated.

The computer system 100 shown in FIG. 2 may be implemented in any type of system in which memory virtualization is performed, including, for example, desktop computers, servers and mobile smartphones. FIG. 6 illustrates a block diagram of a mobile smartphone 600 in which the computer system 100 is incorporated. The smartphone 600 is not limited to being any particular type of smartphone or having any particular configuration, except that it must be capable of performing methods described herein. Also, the smartphone 600 illustrated in FIG. 6 is intended to be a simplified example of a cellular telephone having context awareness and processing capability for performing methods described herein. One having ordinary skill in the art will understand the operation and construction of a smartphone, and, as such, implementation details have been omitted.

In accordance with this illustrative embodiment, the smartphone 600 includes a baseband subsystem 610 and a radio frequency (RF) subsystem 620 connected together over a system bus 612. The system bus 612 typically comprises physical and logical connections that couple the above-described elements together and enable their interoperability. The RF subsystem 620 may be a wireless transceiver. Although details are not shown for clarity, the RF subsystem 620 generally includes a transmit (Tx) module 630 having modulation, upconversion and amplification circuitry for preparing a baseband information signal for transmission, includes a receive (Rx) module 640 having amplification, filtering and downconversion circuitry for receiving and downconverting an RF signal to a baseband information signal to recover data, and includes a front end module (FEM) 650 that includes diplexer circuitry, duplexer circuitry, or any other circuitry that can separate a transmit signal from a receive signal, as is known to those skilled in the art. An antenna 660 is connected to the FEM 650.

The baseband subsystem 610 generally includes the computer system 100, analog circuit elements 616, and digital circuit elements 618, electrically coupled together via the system bus 612. The system bus 612 typically comprises the physical and logical connections to couple the above-described elements together and enable their interoperability.

An input/output (I/O) element 621 is connected to the baseband subsystem 610 via connection 624. The I/O element 621 typically includes, for example, a microphone, a keypad, a speaker, a pointing device, user interface control elements, and any other devices or systems that allow a user to provide input commands and receive outputs from the smartphone 600. A memory 628 is connected to the baseband subsystem 610 via connection 629. The memory 628 may be any type of volatile or non-volatile memory. The memory 628 may be permanently installed in the smartphone 600, or may be a removable memory element, such as a removable memory card.

The analog circuitry 616 and the digital circuitry 618 include the signal processing, signal conversion, and logic that convert an input signal provided by the I/O element 621 to an information signal that is to be transmitted. Similarly, the analog circuitry 616 and the digital circuitry 618 include the signal processing elements used to generate an information signal that contains recovered information from a received signal. The digital circuitry 618 may include, for example, a digital signal processor (DSP), a field programmable gate array (FPGA), or any other processing device. Because the baseband subsystem 610 includes both analog and digital elements, it may be referred to as a mixed signal device (MSD).

The smartphone 600 may include one or more of a variety of sensors such as, for example, a camera 661, a microphone 662, a Global Positioning System (GPS) sensor 663, an accelerometer 665, a gyroscope 667, and a digital compass 668. These sensors communicate with the baseband subsystem 610 via bus 612.

Having the computer system 100 embedded in the smartphone 600 allows multiple OSs and multiple respective VMs to run on the smartphone 600. In this environment, the hypervisor 210 (FIG. 2) of the computer system 100 provides a secure separation between the hardware of the smartphone 600 and the application software being executed by the VMs.

The method described above with reference to FIG. 3 may be implemented solely in hardware or in a combination of hardware and software or hardware and firmware. Likewise, many of the components of the computer system 100 shown in FIG. 2 may be implemented solely in hardware or in a combination of hardware and software or firmware. For example, the hypervisor 210 may be implemented solely in hardware or in a combination of hardware and software or firmware. In cases where the method or a component of the computer system 100 is implemented in software or firmware, the corresponding code is stored in the main memory 120 (FIG. 2), which is a computer-readable medium. The main memory 120 is typically is a solid state computer-readable medium, such as a non-volatile random access memory (RAM), read only memory (ROM) device, programmable ROM (PROM), erasable PROM (EPROM), etc. However, other types of computer-readable mediums may be used for storing the code, such as, for example, magnetic and optical storage devices.

It should also be noted that many variations may be made to the methods described above with reference to FIGS. 2-6 without deviating from the scope of the invention. For example, the configuration of the computer system 100 shown in FIG. 2 may be modified in a number of ways, as will be understood by those of skill in the art. Also, the smartphone 600 shown in FIG. 6 is merely one example of a mobile device that has a suitable configuration and functionality for performing the method. Persons of skill in the art will understand, in view of the description provided herein, that many variations may be made to the smartphone 600 shown in FIG. 6 without deviating from the scope of the invention. These and other variations are within the scope of the invention. The illustrative embodiments described herein are intended to demonstrate the principles and concepts of the invention, but the invention is not limited to these embodiments, as will be understood by those of skill in the art.

What is claimed is:

1. A computer system that reduces processing overhead associated with performing a hardware table walk (HWTW), the system comprising:
    at least one central processing unit (CPU), the CPU running a host operating system (OS) and a hypervisor, the hypervisor controlling execution of at least a first guest OS on the CPU, the hypervisor running at least a first virtual machine (VM) associated with the first guest OS;
    a physical memory in communication with the CPU, the physical memory having physical memory locations that are addressable by physical addresses (PAs), wherein at least one page table is stored at physical memory locations of the physical memory, the page table comprising page table entries corresponding to mappings for mapping an intermediate physical address (IPA) into an actual PA of the physical memory;
    at least one translation lookaside buffer (TLB) that stores a subset of the page table entries; and
    at least one memory management unit (MMU) in communication with the CPU, with the physical memory and with the TLB, wherein the MMU determines whether or not page table entries associated with an IPA are stored in the TLB, wherein if page table entries associated with the IPA are not stored in the TLB, then a TLB miss has occurred, and wherein if a TLB miss occurs, the MMU predicts a PA of the physical memory at which data associated with the IPA is stored;
    wherein the MMU predicts the PA as a function, f, of the IPA as: PA=f(IPA);
    wherein the function, f, is selected from a plurality of functions, and wherein each function of said plurality of functions provides a one-to-one mapping between the IPA and the predicted PA; and
    wherein the hypervisor is running at least a second VM associated with a digital rights manager (DRM) computer program, and wherein the function, f, is IPA_Offset_function(VMID), where VMID is a unique identifier across the first and second VMs that identifies the VM associated with the TLB miss, and where IPA_Offset_function is a function having an output that is selected based on a particular offset value associated with the VMID of the first or second VM that was using the IPA to access memory when the TLB miss occurred, and wherein the predicted PA is predicted as: PA=IPA_Offset_function(VMID).

2. The computer system of claim 1, wherein the function, f, is a polynomial.

3. The computer system of claim 1, wherein the function, f, is a unity function such that PA=IPA.

4. The computer system of claim 1, wherein the computer system is part of a mobile device.

5. The computer system of claim 4, wherein the mobile device is a mobile phone.

6. The computer system of claim 5, wherein the mobile phone is a smart phone.

7. A computer system that reduces processing overhead associated with performing a hardware table walk (HWTW), the system comprising:
    at least one central processing unit (CPU), the CPU running a host operating system (OS) and a hypervisor, the hypervisor controlling execution of at least a first guest OS on the CPU, the hypervisor running at least a first virtual machine (VM) associated with the first guest OS;
    a physical memory in communication with the CPU, the physical memory having physical memory locations that are addressable by physical addresses (PAs), wherein at least one page table is stored at physical memory locations of the physical memory, the page table comprising page table entries corresponding to mappings for mapping an intermediate physical address (IPA) into an actual PA of the physical memory;
    at least one translation lookaside buffer (TLB) that stores a subset of the page table entries; and
    at least one memory management unit (MMU) in communication with the CPU, with the physical memory and with the TLB, wherein the MMU determines whether or not page table entries associated with an IPA are stored in the TLB, wherein if page table entries associated with the IPA are not stored in the TLB, then a TLB miss has occurred, and wherein if a TLB miss occurs, the MMU predicts a PA of the physical memory at which data associated with the IPA is stored;
    wherein the MMU predicts the PA as a function, f, of the IPA as: PA=f(IPA);
    wherein the function, f, is selected from a plurality of functions, and wherein each function of said plurality of functions provides a one-to-one mapping between the IPA and the predicted PA; and
    wherein the hypervisor is running at least a second VM associated with a digital rights manager (DRM) computer program, and wherein the function, f, is IPA XOR Extended_VMID, where XOR represents and exclusive OR operation and Extended_VMID is an extended VMID, and wherein the predicted PA is predicted as: PA=IPA XOR Extended_VMID.

8. A method reducing processing overhead associated with performing a hardware table walk (HWTW), the method comprising:

providing at least one central processing unit (CPU), at least one physical memory, at least one translation lookaside buffer (TLB), and at least one memory management unit (MMU), the CPU, the physical memory, the TLB, and the MMU being in communication with one another, the CPU running a host operating system (OS) and a hypervisor, the hypervisor controlling execution of at least a first guest OS on the CPU, the hypervisor running at least a first virtual machine (VM) associated with the first guest OS, the physical memory having physical memory locations that are addressable by physical addresses (PAs), wherein at least one page table is stored at physical memory locations of the physical memory, the page table comprising page table entries corresponding to mappings for mapping an intermediate physical address (IPA) into an actual PA of the physical memory, the TLB storing a subset of the page table entries; and in the MMU:
determining whether or not page table entries associated with an IPA are stored in the TLB,
if a determination is made that page table entries associated with the IPA are not stored in the TLB, then deciding that a TLB miss has occurred, and
if a decision was made that a TLB miss has occurred, predicting a PA of the physical memory at which data associated with the IPA is stored;
wherein the MMU predicts the PA as a function, f, of the IPA as: PA=f(IPA);
wherein the function, f, is selected from a plurality of functions, and wherein each function of said plurality of functions provides a one-to-one mapping between the IPA and the predicted PA; and
wherein the hypervisor is running at least a second VM associated with a digital rights manager (DRM) computer program, and wherein the function, f, is IPA_Offset_function(VMID), where VMID is a unique identifier across the first and second VMs that identifies the VM associated with the TLB miss, and where IPA_Offset_function is a function having an output that is selected based on a particular offset value associated with the VMID of the first or second VM that was using the IPA to access memory when the TLB miss occurred, and wherein the predicted PA is predicted as: PA=IPA_Offset_function(VMID).

9. The method of claim 8, wherein the function, f, is a polynomial.

10. The method of claim 8, wherein the function, f, is a unity function such that PA=IPA.

11. The method of claim 8, wherein the hypervisor controls execution of at least first and second guest OSs on the CPU, and wherein the hypervisor is also running at least a second VM associated with the second guest OS, and wherein the function, f, that is used by the MMU to predict PAs predicts PAs that are in first range of PAs for a miss that is associated with the first VM and predicts PAs that are in second range of PAs for a miss that is associated with the second VM, and wherein the first and second ranges of PAs are different from one another.

12. The method of claim 8, wherein the method is performed by a computer system of a mobile device.

13. The method of claim 12, wherein the mobile device is a mobile phone.

14. The method of claim 13, wherein the mobile phone is a smart phone.

15. A method reducing processing overhead associated with performing a hardware table walk (HWTW), the method comprising:
providing at least one central processing unit (CPU), at least one physical memory, at least one translation lookaside buffer (TLB), and at least one memory management unit (MMU), the CPU, the physical memory, the TLB, and the MMU being in communication with one another, the CPU running a host operating system (OS) and a hypervisor, the hypervisor controlling execution of at least a first guest OS on the CPU, the hypervisor running at least a first virtual machine (VM) associated with the first guest OS, the physical memory having physical memory locations that are addressable by physical addresses (PAs), wherein at least one page table is stored at physical memory locations of the physical memory, the page table comprising page table entries corresponding to mappings for mapping an intermediate physical address (IPA) into an actual PA of the physical memory, the TLB storing a subset of the page table entries; and in the MMU:
determining whether or not page table entries associated with an IPA are stored in the TLB,
if a determination is made that page table entries associated with the IPA are not stored in the TLB, then deciding that a TLB miss has occurred, and
if a decision was made that a TLB miss has occurred, predicting a PA of the physical memory at which data associated with the IPA is stored;
wherein the MMU predicts the PA as a function, f, of the IPA as: PA=f(IPA);
wherein the function, f, is selected from a plurality of functions, and wherein each function of said plurality of functions provides a one-to-one mapping between the IPA and the predicted PA; and
wherein the hypervisor is running at least a second VM associated with a digital rights manager (DRM) computer program, and wherein the function, f, is IPA XOR Extended_VMID, where XOR represents and exclusive OR operation and Extended_VMID is an extended VMID, and wherein the predicted PA is predicted as: PA=IPA XOR Extended_VMID.

16. A non-transitory computer-readable medium (CRM) having a computer code stored thereon for execution by one or more processors for reducing processing overhead associated with performing a hardware table walk (HWTW), the computer code comprising:
a first code portion for determining whether or not page table entries associated with an intermediate physical address (IPA) are stored in the TLB, wherein if a determination is made that page table entries associated with the IPA are not stored in the TLB, then the first code portion decides that a TLB miss has occurred; and
a second code portion for predicting a physical address (PA) of a physical memory at which data associated with the IPA is stored if the first code portion decides that a TLB miss has occurred
wherein the second code portion predicts the PA as a function, f, of the IPA as: PA=f(IPA);
wherein the second code portion selects the function, f, is from a plurality of functions, and wherein each function of said plurality of functions provides a one-to-one mapping between the IPA and the predicted PA; and
wherein the function, f, is IPA_Offset_function(VMID), where VMID is a unique identifier across first and second virtual machines (VMs) that identifies one of the first and second VMs as the VM associated with the TLB miss, and where IPA_Offset_function is a function having an output that is selected based on a particular offset value associated with the VMID of the first or second VM that was using the IPA to access memory when the TLB miss occurred, and wherein the predicted PA is predicted as: PA=IPA_Offset_function(VMID).

17. The non-transitory CRM of claim 16, wherein the function, f, is a polynomial.

18. The non-transitory CRM of claim 16, wherein the function, f, is a unity function such that PA=IPA.

19. A non-transitory computer-readable medium (CRM) having a computer code stored thereon for execution by one or more processors for reducing processing overhead associated with performing a hardware table walk (HWTW), the computer code comprising:
- a first code portion for determining whether or not page table entries associated with an intermediate physical address (IPA) are stored in the TLB, wherein if a determination is made that page table entries associated with the IPA are not stored in the TLB, then the first code portion decides that a TLB miss has occurred;
- a second code portion for predicting a physical address (PA) of a physical memory at which data associated with the IPA is stored if the first code portion decides that a TLB miss has occurred;
- wherein the second code portion predicts the PA as a function, f, of the IPA as: PA=f(IPA);
- wherein the second code portion selects the function, f, is from a plurality of functions, and wherein each function of said plurality of functions provides a one-to-one mapping between the IPA and the predicted PA; and
- wherein the function, f, is IPA XOR Extended_VMID, where XOR represents and exclusive OR operation and Extended_VMID is an extended VMID, and wherein the predicted PA is predicted as: PA=IPA XOR Extended_VMID.

* * * * *